United States Patent
Höhn

(10) Patent No.: US 6,632,155 B1
(45) Date of Patent: Oct. 14, 2003

(54) DRIVE SYSTEM

(76) Inventor: Bernd-Robert Höhn, Teutonenstr. 19, Munich (DE)

( * ) Notice: Subject to any disclaimer, the term of this patent is extended or adjusted under 35 U.S.C. 154(b) by 1 day.

(21) Appl. No.: 10/009,955

(22) PCT Filed: Jul. 4, 2000

(86) PCT No.: PCT/EP00/06274
§ 371 (c)(1),
(2), (4) Date: Dec. 12, 2001

(87) PCT Pub. No.: WO01/03962
PCT Pub. Date: Jan. 18, 2001

(30) Foreign Application Priority Data

Jul. 7, 1999 (DE) .......................... 199 31 311

(51) Int. Cl.⁷ .............................. B60K 1/02; B60K 1/00
(52) U.S. Cl. .......................................... 477/3; 180/65.2
(58) Field of Search ........................... 475/5; 477/3, 2; 74/661, 329; 180/65.2, 65.6, 65.7

(56) References Cited

U.S. PATENT DOCUMENTS

| | | | | |
|---|---|---|---|---|
| 1,922,210 A | * | 2/1935 | Higley | 74/661 |
| 4,335,429 A | * | 6/1982 | Kawakatsu | 180/65.2 X |
| 4,405,029 A | * | 9/1983 | Hunt | 74/661 X |
| 5,337,848 A | * | 8/1994 | Bader | 180/65.2 |
| 5,560,249 A | * | 10/1996 | Nellums | 477/3 X |
| 5,713,425 A | * | 2/1998 | Buschhaus et al. | 475/5 X |
| 6,307,276 B1 | | 10/2001 | Bader | 290/40 |
| 6,328,670 B1 | * | 12/2001 | Minowa et al. | 477/5 |
| 6,491,602 B1 | | 12/2002 | Hohn | 477/5 |

FOREIGN PATENT DOCUMENTS

| | | | | |
|---|---|---|---|---|
| DE | 195 30 233 A1 | | 2/1997 | B60K/6/02 |
| EP | 492152 | * | 7/1992 | 180/65.2 |
| FR | 2772675 | * | 6/1999 | |

* cited by examiner

*Primary Examiner*—Roger Pang
(74) *Attorney, Agent, or Firm*—Stevens, Davis, Miller & Mosher, LLP

(57) ABSTRACT

The invention relates to a drive system, especially for motor vehicles, with a first power source (10), especially an internal combustion engine, and a second power source (20), especially an electric motor. The power sources acts upon a gearbox (14) that is provided with a plurality of gearwheel sets which modulate. The first power source is linked with the gearbox via a clutch (L1) and the second power source is linked with the gearbox directly. The aim of the invention is to provide a construction that is favorable both in terms of design and functionality. To this end, the first power source acts upon a shaft (12) that carries the one gearwheels of the gearwheel sets and the second power source acts upon a second shaft (16) that carries the other gearwheels of the gearwheel sets. A separate output shaft (22) can be optionally coupled to the first (12) or the second (16) shaft.

13 Claims, 2 Drawing Sheets

DRIVE SYSTEM

FIELD OF THE INVENTION

The invention relates to a drive system, for motor vehicles in particular, and to a process for operation of a motor vehicle with such a drive system.

BACKGROUND OF THE INVENTION

A generic drive system is disclosed in DE 197 37 791 A1; this system has an internal combustion engine as first power source, an electric motor as second power source, and a gear box with four speed gears as speed change mechanism. The internal combustion engine acts by way of a clutch on a countershaft of the transmission, while the electric motor is connected directly to the countershaft. This drive system may be used, for example, to start and drive in the lower speed range by way of the electric motor. Through engagement of the clutch on the internal combustion engine side the internal combustion engine as well may then be engaged and optionally the electric motor switched to operate as a generator. The same speed ratios of the speed change gears of the speed change mechanism are used in the both modes of operation; hence four gears are available in the drive system in question.

DE 195 30233 A1 discloses another drive system, one with an internal combustion engine as a power source, an electric motor as another power source, and a gear box with five sets of gears as speed change mechanism. The internal combustion engine propels the front end of the drive shaft of the transmission (gear change box) by way of the engaging and disengaging clutch, while the electric motor is rigidly connected to the rear end of the drive shaft by way of a gear stage. In this instance as well the electric motor may be engaged as a generator. Consequently, in both modes of operation, as in the case of DE 197 37 791 A1 the same transmission ratios of the speed change gear set of the speed change may be used. Accordingly, five gears are available.

SUMMARY OF THE INVENTION

The object of this invention is to design the generic drive system at low additional cost and much more favorably and so as to possess greater versatility with respect to gear ratio spread a number of speeds.

It is claimed for this invention that this object is attained by means of the characteristics provided in the claims.

It is a further object of this invention to provide a drive system for a vehicle which operates using an internal combustion engine and an electric power source of which a comfortable, optionally acceleration optimized operation of the vehicle can be achieved.

Application of the measures claimed for the invention yields the particular advantage that the gearbox is used as speed change mechanism in both directions of power flow with respect to the speed change gear sets of the first or the second power source, designated in what follows as internal combustion engine and electric motor, the following functions being possible through simple engagement and disengagement of clutches:

1. Power by way of the electric motor only for starting and for forward or reverse driving in an urban area;
2. Power by way of the internal combustion engine only, but with gear step-up or reduction at higher speeds, but optionally also for starting (emergency operation);
3. Drive by way of both power sources in the event of extreme acceleration;
4. Starting the internal combustion engine by means of the electric motor;
5. Engagement of the electric motor as generator to supply the vehicle electrical system in operation of the internal combustion engine and optionally in operation of the brake of the motor vehicle; and
6. Brief propulsion by the electric motor between gear-shift stages to prevent or reduce interruption of tractive power in internal combustion engine operation.

Consequently, application of the solution proposed results in doubling of the speed ranges, so that in theory eight speeds or transmission stages may be used with four speed-change gear sets. It is also of particular advantage if power connections differing from the viewpoint of their transmission ratios, such as gears, chains, etc. are provided. In the process the connection engaging the electric motor, preferably a first spur pinion, may be designed for higher starting torque and lower speed range, while the power connection engaging the internal combustion engine or the pertinent gear set may be designed optimally for higher vehicle speeds, up to fuel conserving overdrive operation.

The engaging and disengaging clutches may be positive locking jaw clutches, synchronous clutches, and/or friction clutches which are mounted on the driven shaft and/or the other two gear shafts, depending on the structural relationships. A clutch which may also be used as starting clutch (single-disk dry clutch or multiple-disk clutch) should also be provided in the power flow on the internal combustion engine side in order to make starting of the vehicle by way of the internal combustion engine possible at least in emergency operation.

A drive system particularly well suited for front-wheel drive or all-wheel drive is provided in another embodiment such that the driven shaft is power-connected by a chain to one of the gear shafts. This permits spatially favorable mounting of the drive shafts and, in particular, makes possible an integrated differential for the front axle of the motor vehicle.

According to another embodiment, the drive system described is to be operated as follows:

First the electric motor is started by an electronic control unit with set transmitter power value on the gas pedal, as a function of speed and/or power, when the gas pedal is actuated, and the starting torque and the speed are controlled by appropriate current regulation. Shifting through the first gears may be effected by manual or automatic shifting. Starting at a definite speed or higher power demand (full throttle or optionally kickdown actuation) the internal combustion engine is connected and activation (by ignition) and its power output adjusted upward, optionally with simultaneous switching from electric motor operation to internal combustion engine operation (shifting of connectable drive connections accompanied by reversal of power flow in the transmission). In the process it may be advantageous to feed additional power to the electric motor or, in the event of lower power requirement for supplying the vehicle electric network, to switch to generator operation.

By preference the different transmission ratios of the drive connections are designed so that a vehicle is driven only by the electric motor over traffic stretches with speed limits, such as 30 km/hr, in operation more or less at this speed stages of operation of the internal combustion engine involving partial load areas unfavorable to efficiency and release of noise and exhaust gas emissions are thereby largely avoided.

In addition, during internal combustion engine operation the electric motor may also be engaged for short periods in gear shift phases on the basis of its direct coupling in order to prevent interruptions of tractive power. Since this engagement is for a very brief period only, the possibility exists of operating the electric motor without damage in the overload area and thus also that of adding high drive torque.

BRIEF DESCRIPTION OF THE DRAWINGS

Several embodiments of the invention are discussed below and are clarified by additional details. In the schematic drawings.

DETAILED DESCRIPTION OF THE PREFERRED EMBODIMENT

Figure 1:
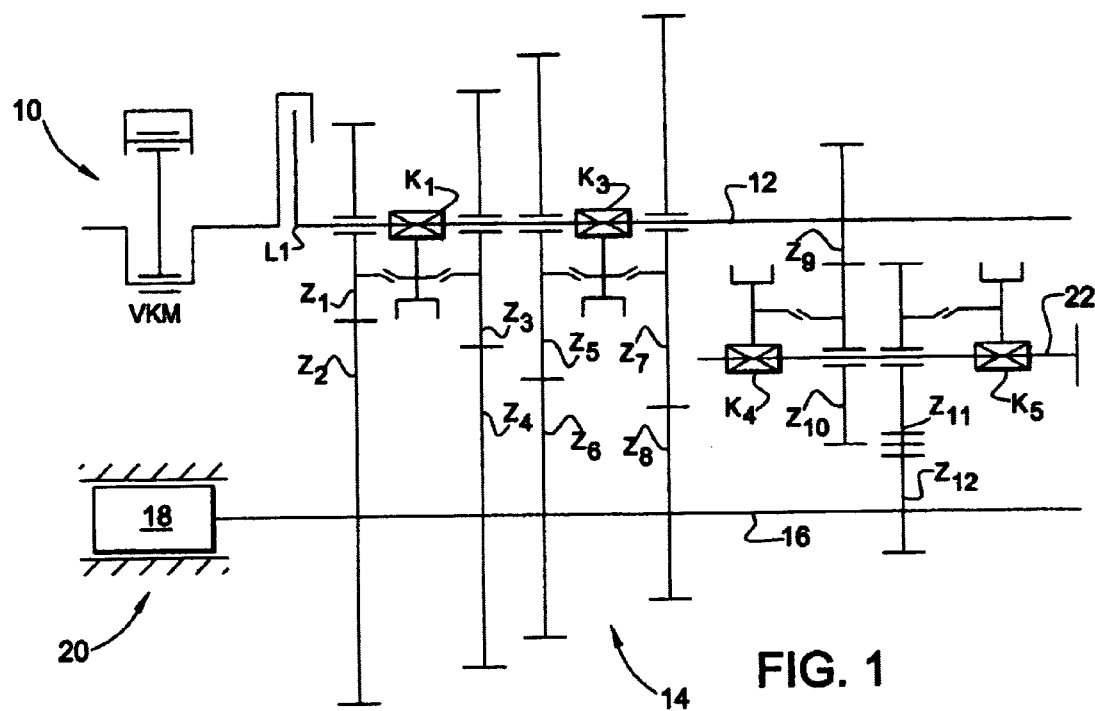
FIG. 1 illustrates a drive system with an internal combustion engine and a speed change gear, the latter with a shaft with clutches which may be connected to the speed change gear sets.

In FIG. 1, 10 designates an internal combustion engine which may be connected by way of a friction clutch $L_1$ to a first shaft 12 of a speed change gear 14 which may be connected to four speed change gear sets $Z_1$–$Z_2$, $Z_3$–$Z_4$, $Z_5$–$Z_6$, and $Z_7$–$Z_8$, gears $Z_2$, $Z_4$, $Z_6$, and $Z_8$ being rigidly connected to a second shaft 16. The shafts are, of course, suitably housed in a housing not shown. The speed change gear sets may be engaged and disengaged by positively locking synchronous clutches $K_1$, $K_3$ mounted on shaft 12, it being possible to couple any of the gears $Z_1$, $Z_3$, $Z_5$, or $Z_7$ mounted on shaft 12 with the shaft 12.

The rotor 18 of an electric motor 20, which may be a rotary current motor, for example, acts directly on the second shaft 16 of the speed change gear 14.

Also mounted on the shaft 12 is gear $Z_9$, which may be coupled by way of another synchronous clutch $K_4$ to a gear $Z_{10}$ on a driven shaft 22 mounted parallel to shafts 12, 16.

Similarly, there is mounted on shaft 16 a gear $Z_{12}$ which meshes with another gear $Z_{11}$ on the driven shaft 22 and may be connected to the shaft 16 by way of a positive-locking synchronous clutch $K_5$.

The driven shaft 22, for example in a rear wheel drive vehicle, acts on a rear axle differential by way of a cardan shaft not shown.

The drive system described operates as follows.

If the vehicle is to be started, the clutches $L_1$ and $K_5$ are open and the clutch $K_4$ closed. The clutches may be controlled manually by way of a shift lever or, in the case of automated vehicle operation, by way of suitable hydraulically controllable actuators and an electronic control unit not shown which also controls the power electronics of the electric motor 20 and is also connected to the control unit of the internal combustion engine 10. For the sake of simplification, manual operation is described below, the pertinent power flow in the drive system being described.

If starting of the vehicle is initiated by the gas pedal, not shown, and by an electronic command value transmitter, after the first gear (starting gear) has been engaged by shifting of the synchronous clutch $K_3$ to the right (in the drawing) and corresponding activation of the speed change gear set $Z_7$–$Z_8$, the electric motor drive being activated simultaneously by shifting of synchronous clutch $K_4$ to the left in the drawing, the power flow moves from the rotor 18 of the electric motor 20 by way of the shaft 16 and the gear set $Z_7$–$Z_8$ to the shaft 12, and from the latter by way of the spur pinion et $Z_9$ and d $Z_{10}$ at a specific transmission ratio to the driven shaft 22. Since this specific transmission ratio is relatively small, the driving torque of the electric motor 20 is correspondingly increased.

Consequently, speed-change gear set $Z_6$–$Z_5$, $Z_4$–$Z_3$, and finally $Z_2$–$Z_1$ may be engaged in sequence by means of the electric motor 20. Gears 1 to 4 could accordingly be engaged in the case of manual shifting. The speed range of the motor vehicle covered may range from starting to 30 km/hr or 50 km/hr as a result of appropriate design of the gears. It may also be advisable if applicable to use only three gears, for example, in electromotive operation.

If a higher speed or power of the vehicle is necessary, initially either only the internal combustion engine 10 may be engaged by engagement of the main clutch $L_1$ or additional gears 5 to 8 are additionally engaged by reversal of the power flow in the gear change box 14.

For this purpose the fifth gear is engaged (synchronous clutch $K_1$ for speed change gear set $Z_1$–$Z_2$ already closed) in order to reverse the position of synchronous clutches $K_5$, $K_4$ ($K_4$ open, $K_5$ closed), and accordingly the vehicle is powered by the internal combustion engine 10, it being possible to engage or disengage gears 5 to 8 in the reverse direction of power flow and with a higher transmission ratio.

In order to prevent interruption of tractive power, in the case of internal combustion engine operation in each of gears 5 to 8 during reversal the electric motor 20 is activated briefly with driving torque high enough so that the latter largely eliminates interruption of tractive power. The electric motor in this instance acts directly on the shaft 16 and on the driven shaft 22 by way of the activated spur pinion set $Z_{12}$–$Z_{11}$. Since the electric motor is activated in this case only for the brief shifting period, this motor may also be operated in the overload area to achieve high driving torque.

In the event of high power requirement resulting from actuation of the gas pedal of the motor vehicle, the electric motor 20 may also be engaged to increase power. Otherwise the electric motor 20 may be engaged conventionally as generator and, at least in the event of excess power delivered by the internal combustion engine 10 (especially in partial load operation unfavorable to efficiency) supplies corresponding current to the vehicle electrical system or drive batteries of the vehicle.

Figure 2:
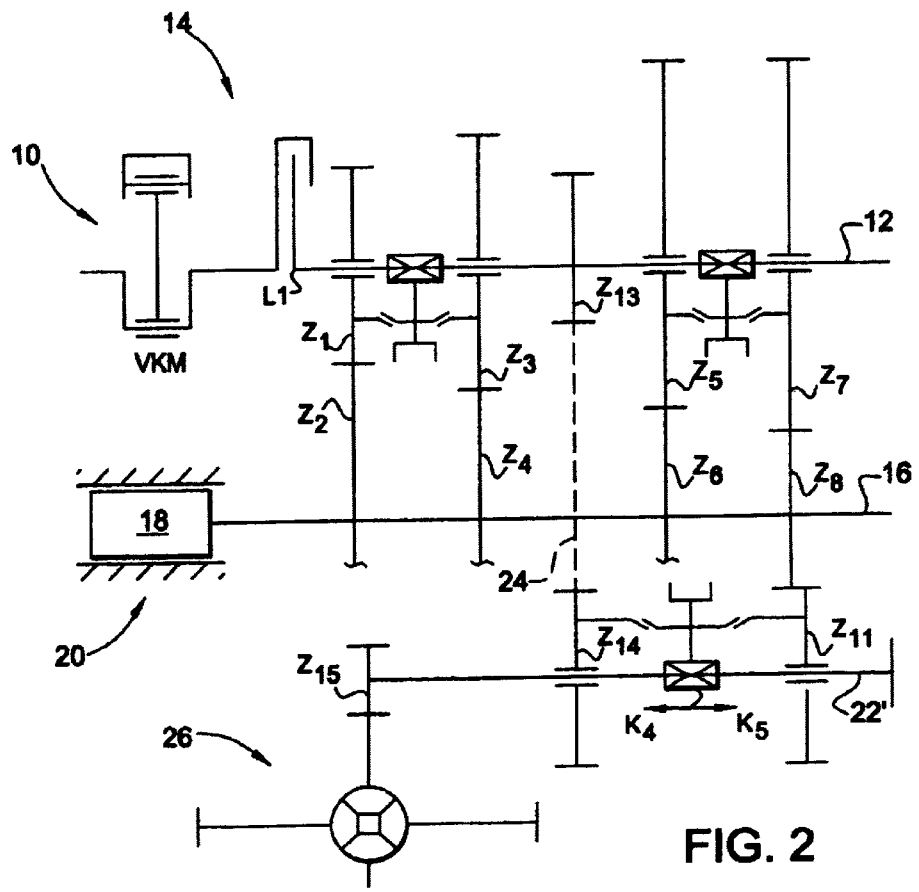
FIG. 2 a drive system as shown FIG. 1, but with a chain as drive connection between the driven shaft and one of the driving gear shafts.
Figure 3:
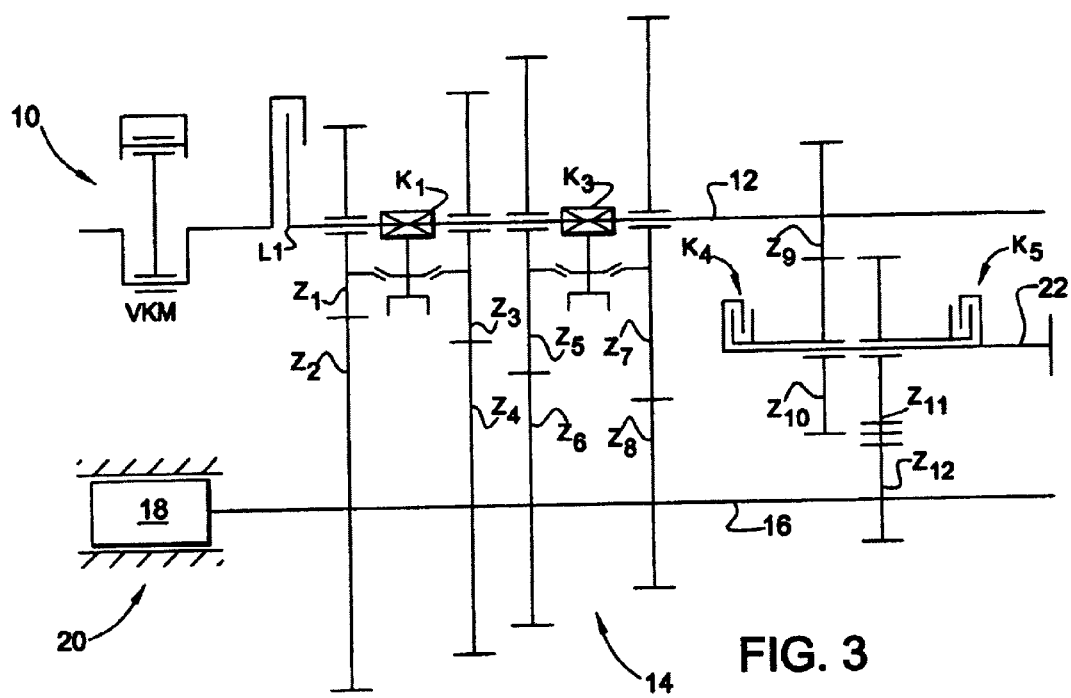
FIG. 3 illustrates another embodiment of the drive system of FIG. 1.
Figure 4:
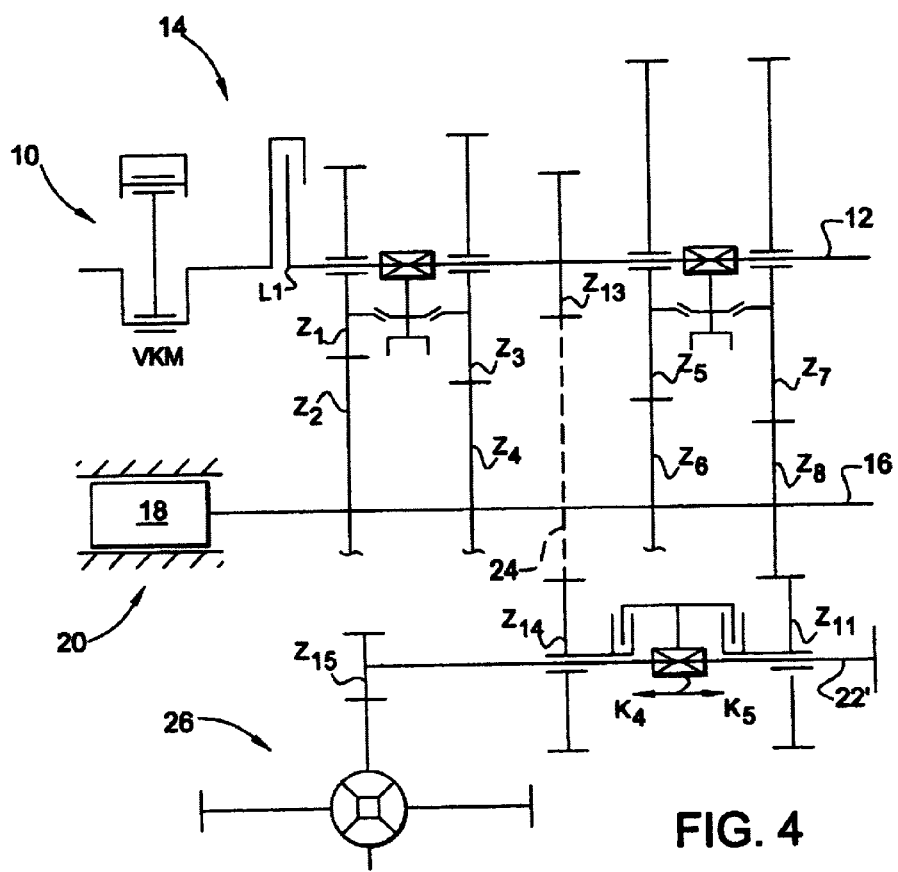
FIG. 4 illustrates another embodiment of the drive system of FIG. 2.

FIG. 2 presents an embodiment alternative to the drive system shown in FIG. 1. Functionally identical parts are designated by identical reference numbers.

As is to be seen in FIG. 2, the driven shaft 22' is drive connected by way of a chain 24 to the shaft 12 of the gear change box 14, the chain 24 running over corresponding chain wheels $Z_{13}$–$Z_{14}$. The chain wheels $Z_{13}$–$Z_{14}$ with chain 24 functionally replace the spur pinions $Z_9$–$Z_{10}$ of FIG. 1.

The chain 24 permits three-dimensional layout of the gear shafts 12, 14, 22' such that a differential 26, e.g., for the front drive of the vehicle, integrated into the gear change box, may be accommodated. The differential is driven by means of the pinion $Z_{15}$ mounted on the driven shaft 22'. The other end of the driven shaft 22' may optionally be tapped for a rear wheel drive (for four wheel drive).

As a result of use of the chain 24 the drive connection between the driven shaft 22' and the shaft 16 is such that the gear wheel $Z_8$ of the corresponding gear stage $Z_7$–$Z_8$ is additionally engaged with gear $Z_{11}$ of driven shaft 22', while gear $Z_{12}$ may be omitted. However, use of an intermediate gear on the chain drive or on spur pinion set $Z_{11}$–$Z_{12}$, as illustrated in FIG. 1, is also possible.

Operation of the drive system is in other respects as described in connection with FIG. 1.

The drive systems described in the foregoing have been presented with only little detail. Housings, shaft bearings, etc. may be produced by state-of-the-art transmission engineering. Reverse operation of the vehicle can be controlled by appropriate pole reversal of the electric motor 20; a shift lever not shown or switch is to be provided for the purpose. The speed of the vehicle in reverse travel operation may be limited to 15 km/hr, for example, by the electronic control unit. Automated driving with corresponding electronic control and hydraulically and/or electrically operated actuators may be provided in place of manual shifting. In addition, friction clutches, multi-plate clutches in particular, may be used in place of the synchronous clutches described; this would permit uninterrupted shifting, for example, from fourth to fifth gear as shown in the exemplary embodiment, especially for clutches $K_4$, $K_5$ on the driven shaft 22.

What is claimed is:

1. A drive system, for motor vehicles comprising a first power source, an internal combustion engine, and a second power source, an electric motor, which act on a gearbox having a plurality of speed change gear sets as speed selector, the first power source connected by way of a clutch to a first shaft of the gearbox and the second power source directly connected to a second shaft of the gearbox, wherein a separate driven shaft is provided which is coupled alternatively to the first shaft or the second shaft of the gearbox when the speed change gear sets of the gearbox engage to transmit torque from the second shaft to the first shaft when the second power source powers the vehicle or from the first shaft to the second shaft when the first power source powers the vehicle, respectively.

2. A drive system as specified in claim 1, wherein the driven shaft may be drive connected to the first shaft or the second shaft by way of connectible gears.

3. A drive system as specified in claim 2, wherein at least one clutch for meshing the connectible gears is mounted on the driven shaft.

4. A drive system as specified in claim 3, wherein the at least one clutch is a friction clutch.

5. A drive system as specified in claim 1, wherein the speed change gear sets may be shifted by positive-locking clutches.

6. A drive system as specified claim 2, wherein transmission ratios of the speed change gear sets and of the connectible gears are designed so that, in an event of actuation by way of the second power source, a starting speed and a lower speed range are covered, and in an event of actuation by the first power source a higher speed range up to an overdrive operation is covered.

7. A drive system as specified in claim 6, wherein a gear wheel of the connectible gears meshes directly with a gear wheel of one of the speed change gear sets rigidly connected to the second shaft.

8. A process for operation of a motor vehicle with a drive system as specified in claim 1, characterized in that, in the event of operation with the first power source, during a change from one speed change gear set to another speed change gear set, the second power source is switched to provision of power to eliminate interruption of tractive power.

9. A process as specified in claim 8, wherein the electric motor is activated during the gear change in order to deliver increased power.

10. A drive system as specified in claim 1, wherein the driven shaft is connected alternatively to the second shaft by way of connectible gears and to the first shaft by way of a chain.

11. A drive system as specified in claim 1, wherein each of said first and second shafts has mounted thereon a drive gear that engages a respective driven shaft gear engagable to the driven shaft via a synchronous clutch.

12. A drive system as specified in claim 1, wherein each speed change gear set comprises a first shaft gear engagable on the first shaft via a synchronous clutch and a second shaft gear mounted on the second shaft.

13. A drive system as specified in claim 12, wherein gear ratios for each of the plurality of speed change gear sets vary such that each speed change gear set provides a varying transfer of rotational speed between the first and second shafts.

* * * * *